Nov. 6, 1962 D. A. VINCENT 3,061,889
APPARATUS FOR RECOVERING CATTAIL FLUFF
Filed June 2, 1958
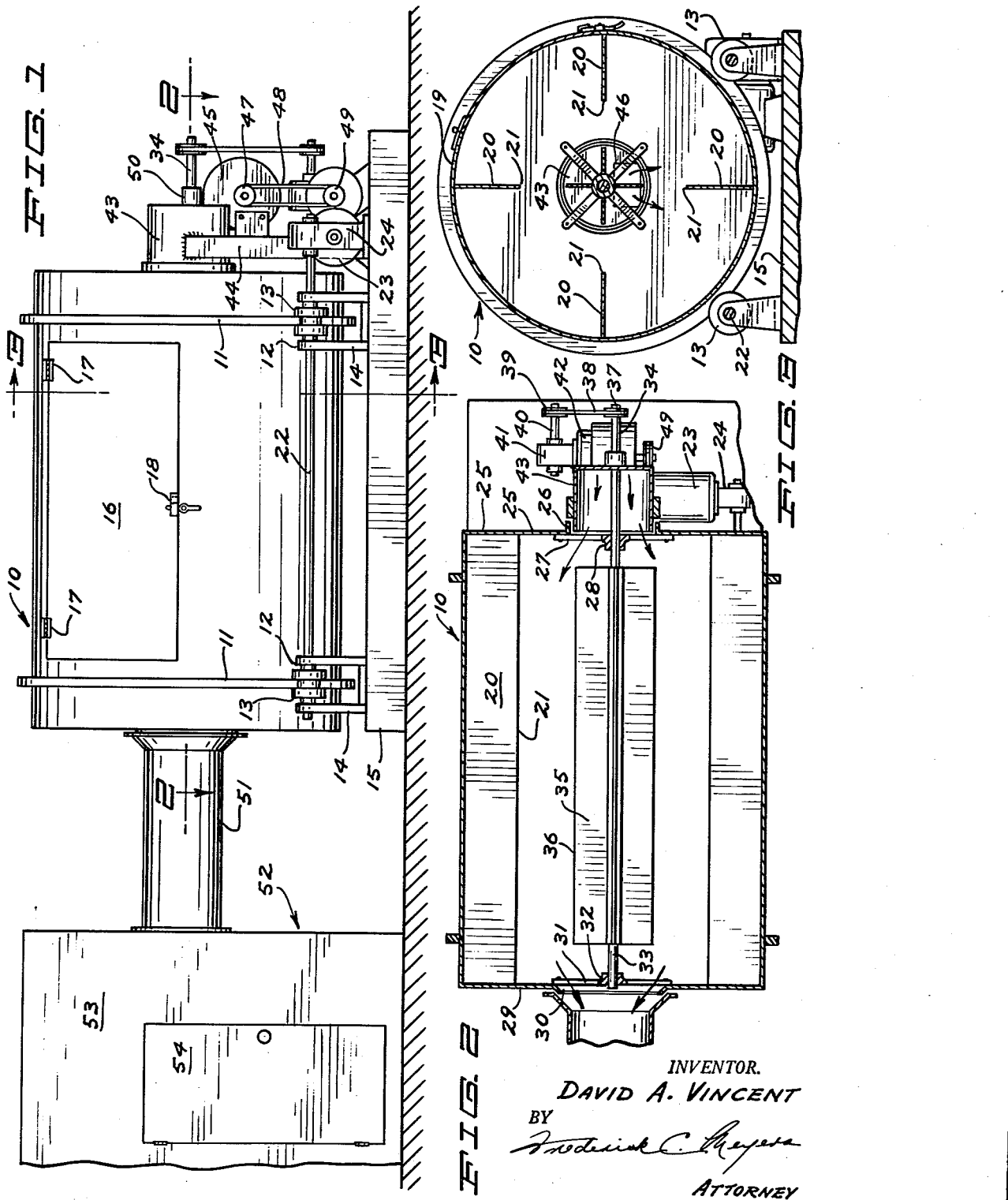
INVENTOR.
DAVID A. VINCENT
BY
Frederick C. Meyers
ATTORNEY

United States Patent Office 3,061,889
Patented Nov. 6, 1962

3,061,889
APPARATUS FOR RECOVERING CATTAIL FLUFF
David A. Vincent, Wilton, Minn., assignor to Typha Products, Inc., Bemidji, Minn., a corporation of Minnesota
Filed June 2, 1958, Ser. No. 739,399
3 Claims. (Cl. 19—90)

This apparatus relates to the treatment of cattails, and more particularly to separating and recovering the fluffy exterior fibrous material therefrom.

I have found that the fluffy fibers obtainable from the common cattail plant found in marshlands has many uses as a fibrous material. When properly recovered, it has a soft and silky appearance and is very light. Further, the fluff has a natural repellance for water and will tend to remain dry except when subjected to wet conditions for a prolonged time.

Because of the toughness and compact nature of the fiber and the fragile character of the stem within each cattail, a special problem arises in separating and fluffing the fiber. Further, the seeds tend to become intermingled with the fluff and once the fluff is matted, the separation of the seeds becomes difficult.

I have tried various standard procedures such as carding, milling and abrading but find that if such procedure is adequate to break down or separate the tufts of fiber, then the treatment becomes drastic and the proportion of broken stem pieces and seed material retained in the fluff increases and only a partial separation can be effected by subsequent screening.

It is an important object of the present invention to overcome the above noted difficulties and to provide apparatus which will effectively separate cattail fiber from the stems and to simultaneously separate out a large percentage of the seeds present.

Another object of the invention is to provide apparatus of the class described which will not only effect separation of the fibrous material from the seeds and the stem material but will separate and collect the fibers themselves in a pure fluffy fraction.

These and other objects and advantages of my invention will more fully appear from the following description, made in connection with the accompanying drawings wherein like reference characters refer to the same parts throughout the several views and in which:

FIGURE 1 is a side elevation of my fluffing machine;
FIGURE 2 is a horizontal section taken on the line 2—2 of FIGURE 1; and
FIGURE 3 is a vertical section taken on the line 3—3 of FIGURE 1.

With continued reference to the drawing, my invention utilizes a rotary open-ended drum indicated generally at 10 and is adapted to separate cattail fluff from the seeds and stem portions and, at the same time, to open and separate the fibers of fluff from the tufted material and recover the same. The open-ended drum 10 is mounted for rotation on a horizontal axis and to this end I provide circular rail members 11 in spaced relation, as shown in FIGURE 1. The circular rails 11 ride in trunnions 12 so that a pair of the trunnions 12 cradle a track 11 at one end of the drum 10 and another pair of trunnions 12 cradle the other circular track 11. The trunnions 12 each have a grooved wheel element 13 journaled in the bearing bracket 14 which, in turn, is mounted on base 15. The drum 10 is provided with a door 16 hingedly mounted at 17 and having a latch 18 which will permit the door 16 to be opened and closed at will. When closed, the door 16 forms a part of the cylindrical shell 19, as shown in FIGURE 3, and when open permits the charging of crude cattail tops and the discharge of seeds and stems.

Mounted within the shell 19 of drum 10 are deflector blades 20 which extend inwardly from shell 19 to terminate at edge 21 in spaced clearance with the axis of rotation of the drum and substantially parallel thereto as seen in FIGS. 2 and 3. The drum 10 is adapted to rotate through drive shaft 22 passing through the grooved wheel element 13 at one side of the base 15, and shaft 22 is, in turn, rotated through the motor 23 and gear reduction box 24. The drum 10 rotates at a speed such as will tumble the crude cattail heads from the deflectors 20 as the drum rotates but not at a speed such as will cause the heads to be maintained in centrifugal contact with the drum shell 19 during its rotation.

The end 25 of drum 10 is provided with a restricted inlet 26 and a spider 27 is secured thereacross with a bearing 28 aligned axially with the drum 10. The opposite end 29 of drum 10 likewise has a restricted opening 30 across which a spider element 31 is secured. A bearing 32 is positioned axially of the drum and is aligned with the bearing 28 so as to rotatably receive a shaft 23 having an extension 34 projected endwise of the drum 10. Beater blades 35 are secured to shaft 33 and the outer edges 36 thereof are adapted to lie in spaced clearance with edges 21 of the deflectors 20. The beater blades 35 also have surfaces substantially parallel to the axis of drum 10 and are intended to be rotated in a direction opposite to that of the deflector blades 20 and at a rate considerably greater so as to strike and reverse the direction of the cattail heads as they are tumbled from the deflectors 20. The shaft 34 has a sheave 37 which is rotatably driven through belt 38 which, in turn, is driven by the sheave 39 mounted on shaft 40 of the gear box 41. Gear box 41 in turn is secured to and driven by the motor 42, as shown in FIGURES 1 and 2.

Mounted externally of the restricted inlet 26 is a cylindrical chamber 43 being supported on the frame 44 which in turn is moutned on base 15. The chamber 43 has a close interfitting relation with the inlet 26 to minimize the escape of air passing from the chamber 43 through the restricted inlet and into the interior of drum 10. Air is supplied through centrifugal fan 45 which has its outlet 46 in communication with the chamber 43, as shown in FIGURE 3. Fan 45 has a rotor 47 driven by belt 48 which in turn is driven by a sheave 49 directly driven by motor 42. The outlet 46 of fan 45 is conveniently positioned below the axial center of the chamber 43 so that a bearing 50 may be secured thereto to provide additional support for the shaft extension 34.

At the restricted outlet 30 of drum 10 is disposed in close clearance therewith a conduit 51 which provides a passageway from the drum outlet 30 to a collecting member indicated generally at 52. The collecting member may be a large box or room having wall enclosures 53 and provided with an access door 54.

During the use and operation of my apparatus, ripe cattail heads are charged in crude form into the drum 10 through the door 16. With the door 16 in latched condition, the drum 10 is caused to rotate on its trunnions and the higher speed beater plates 35 are caused to rotate in the opposite direction longitudinally of the drum 10. At the same time, a mild draft of air is caused to circulate from one end of the drum 10 to the other through energization of the fan 45, and the draft continues through conduit 51 into collecting chamber 53. Since the tumbling and beating of the heads is not drastic, the first results will be separation of tufts of fiber from the stem portions and freeing of a large percentage of the seeds which lie between the stems and the fibrous material. Since the material is being tumbled freely in air, the seeds and stem portions will tend to accumulate on the deflectors 20 where they are again tumbled and fed to the beater blades. Since the material is maintained in freely agitated condition, the seeds and stem portions are permitted to fall through the air-borne fluff and to be retained in the drum 10. When substantially all of the fluffy material has been borne through the drum and into the collecting chamber 52, the remaining seeds and stems may be discharged through the door 16. Where it is desired to recover the seeds such as for planting purposes, a simple screening operation may be employed to separate the stems and other foreign material from the seeds.

It will, of course, be understood that various changes may be made in the form, details, arrangements and proportions of the parts without departing from the scope of my invention as set forth in the appended claims.

What I claim is:

1. Apparatus for separating cattail components which comprises, a closed peripheral surface cylindrical drum having an inlet and outlet of lesser extent than the diameter of said drum, deflector blades having surfaces substantially parallel to the axis of said drum mounted within the drum adjacent the circumference thereof, a rotary beater having surfaces substantially parallel to the axis of said drum mounted within said drum in spaced clearance with said deflector blades and having a shaft projecting endwise of the drum for rotating independently of the drum in a direction opposite that of the drum, a fan means discharging into the drum at said inlet to produce a mild air draft for carrying air-borne fluff through the drum to said outlet, and a collecting member at said outlet for receiving and collecting air-borne fluff substantially free of stems and seeds, whereby the air-borne fluff is separated from the stems and seeds and the stems and seeds remain in said drum.

2. Apparatus for separating cattail components which comprises, a cylindrical drum having a solid peripheral surface with a restricted inlet at one end and a restricted outlet at the other end, a fan discharge within said restricted inlet for supplying a mild air draft within said drum, a hinged opening in said drum for admitting crude cattails and discharging cattail components not carried in the air draft, deflector blades having surfaces substantially parallel to the axis of said drum mounted within the drum at the inner surface thereof to tumble crude cattails placed therein, a rotary beater having surfaces substantially parallel to the axis of said drum mounted axially within said drum and having a driving shaft projecting endwise therefrom for driving independently of the drum in a direction opposite that of the drum, and a collecting chamber connected to said outlet to collect air-borne fluff carried through the drum by the mild air draft, whereby air-borne fluff is separated from seeds and stems remaining in the drum and said seeds and stems are discharged therefrom through said hinged opening.

3. Apparatus for separating cattail components which comprises, a cylindrical drum provided with an opening in the surface thereof for receiving crude cattails, said drum also provided with an inlet at one end and an outlet at the other end, said inlet and outlet being of lesser diameter than the diameter of said drum, deflector blades having surfaces substantially parallel to the axis of said drum mounted within said drum at the inner surface thereof for tumbling said crude cattails, a rotary beater having surfaces substantially parallel to the axis of said drum mounted axially within said drum and having a driving shaft projecting endwise therefrom for driving independently of the drum, said crude cattails entering the drum through said opening in a direction substantially normal to said beater, a fan having a fan discharge at said inlet for blowing a mild air draft through the entire volume of said drum, said mild air draft carrying air-borne fluff from the drum to said outlet, and a collecting chamber located at said outlet for receiving and collecting said air-borne fluff substantially free of stems and seeds, whereby seeds and stems from the crude cattails are discharged from the drum through said opening.

References Cited in the file of this patent

UNITED STATES PATENTS

| | | |
|---|---|---|
| 263,121 | Daffin et al. | Aug. 22, 1882 |
| 796,794 | Baur | Aug. 8, 1905 |
| 1,778,431 | Pearce | Oct. 14, 1930 |
| 1,918,774 | Murray | July 18, 1933 |
| 1,964,259 | Green | June 26, 1934 |
| 2,136,839 | Brown | Nov. 15, 1938 |
| 2,426,813 | Berkman et al. | Sept. 2, 1947 |